United States Patent [19]

Landsness

[11] 4,304,369

[45] Dec. 8, 1981

[54] STOCK SERVICER FEEDER

[75] Inventor: Clifford A. Landsness, Akron, Ohio

[73] Assignee: The B. F. Goodrich Company, Akron, Ohio

[21] Appl. No.: 168,866

[22] Filed: Jul. 14, 1980

[51] Int. Cl.³ .................... B65H 25/22; B65H 75/34
[52] U.S. Cl. ................................. 242/75.43; 242/64;
242/75.45; 242/156.2
[58] Field of Search ............... 242/75.43, 75.44, 75.45,
242/156.2; 156/406

[56] References Cited
U.S. PATENT DOCUMENTS

| 1,103,142 | 7/1914 | Hunting | 242/75.43 |
| 1,218,763 | 3/1917 | Grove | 242/75.43 |
| 2,261,891 | 11/1941 | Stewart | 242/75.43 |
| 2,655,321 | 10/1953 | Sternad | 242/64 X |
| 2,838,252 | 6/1958 | Tomasch | 242/75.43 |

Primary Examiner—Edward J. McCarthy
Attorney, Agent, or Firm—Joseph Januszkiewicz

[57] ABSTRACT

A brake compensator for use in a servicer that supplies sheet material at a predetermined tension to a tire building drum. Such servicer has a plurality of supply rolls journaled on bearings wherein the bearings have support frames that are fixed to the frames. Collars on shafts that have brake material thereon rest on the support frames and have cooperative surfaces that provide a tensioning to the fabric that is proportional to the quantity of material on the supply roll of the shaft.

8 Claims, 9 Drawing Figures

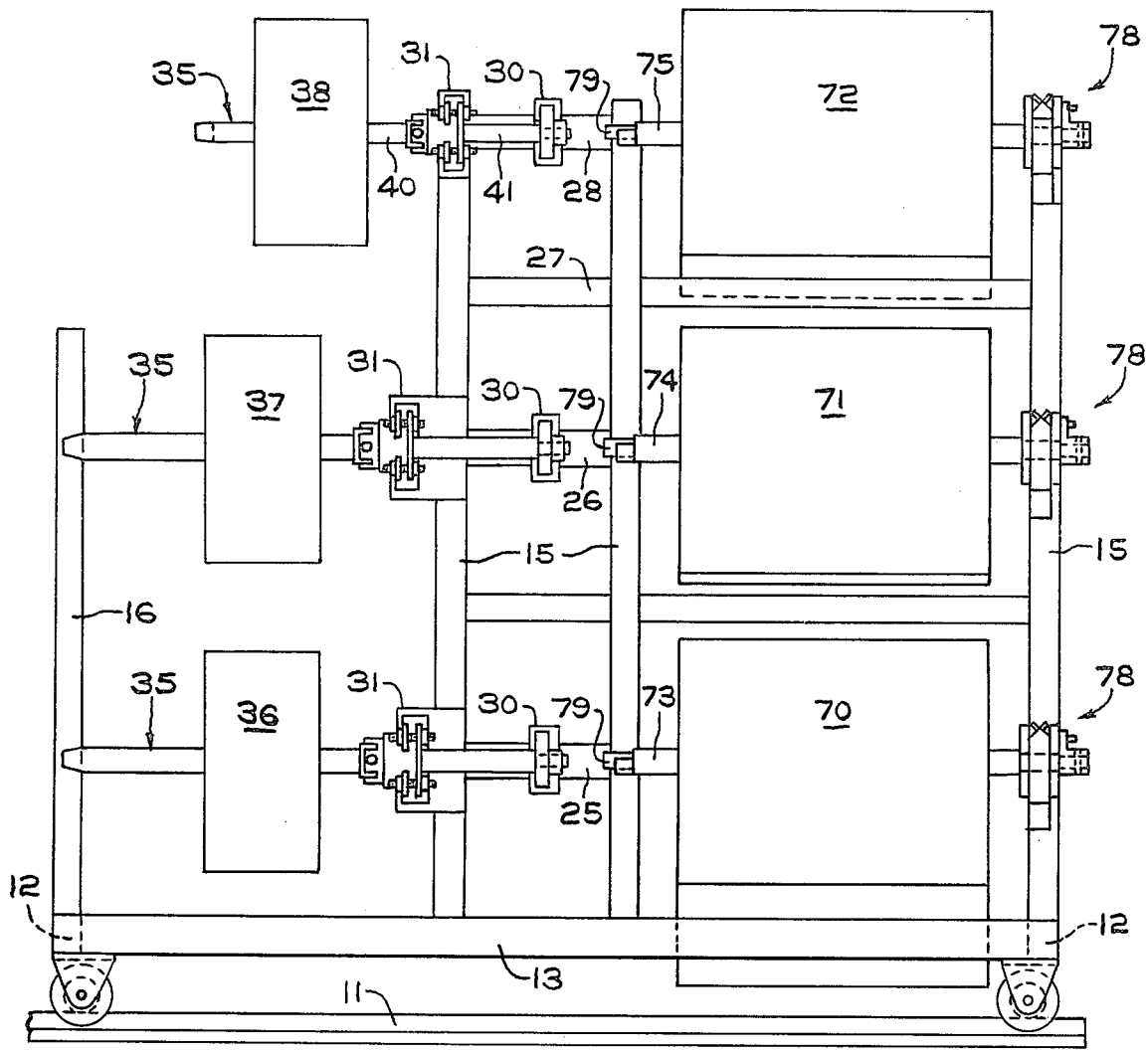
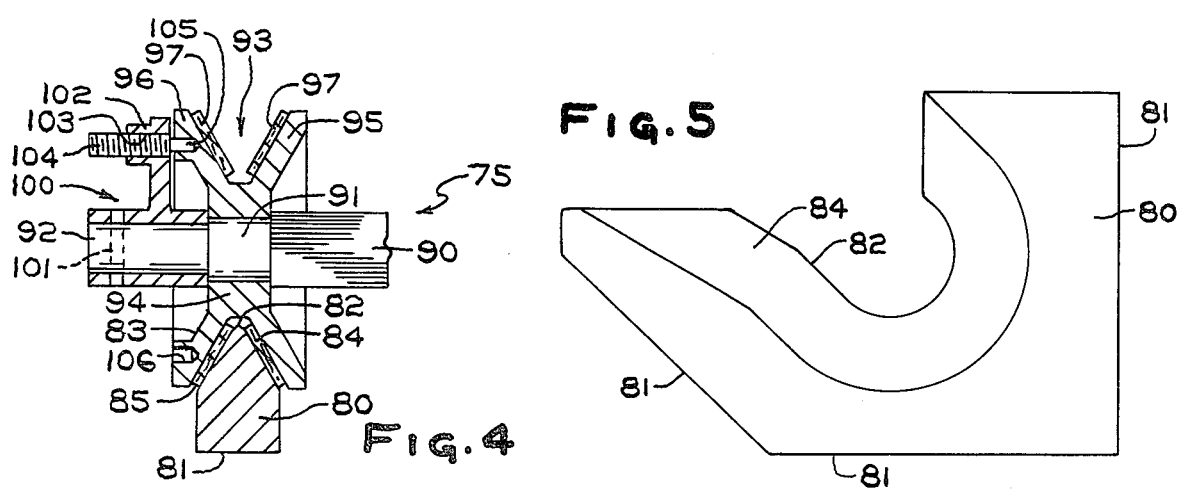

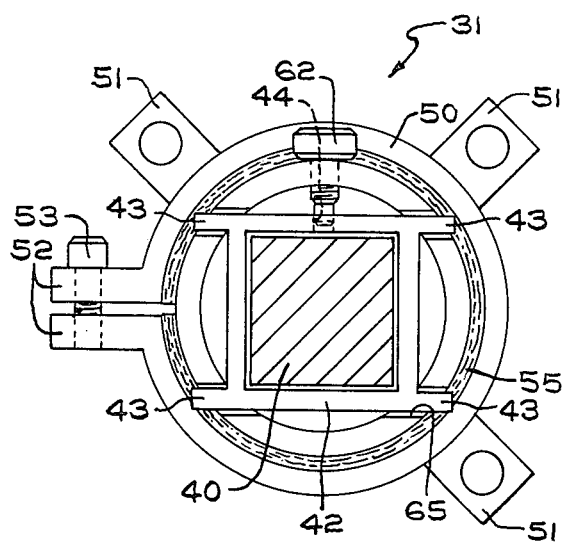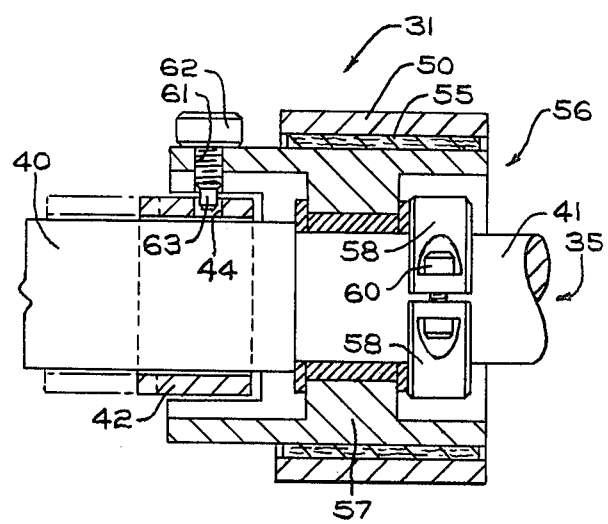
FIG. 7    FIG. 6
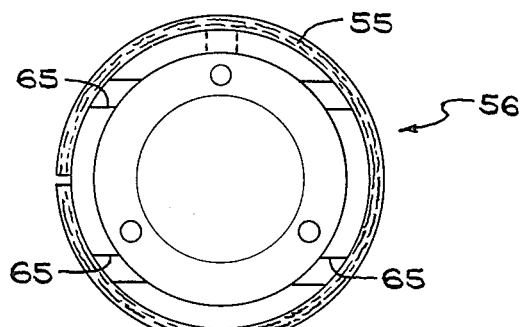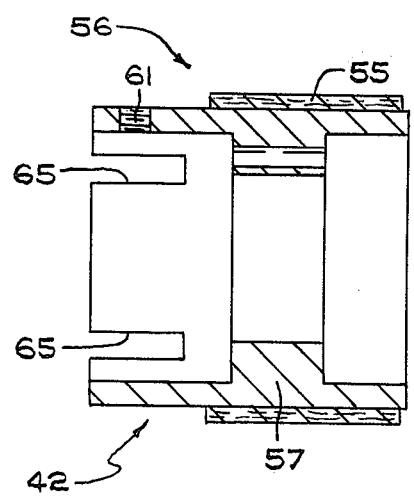
FIG. 9    FIG. 8

STOCK SERVICER FEEDER

This invention relates to a strip feeding apparatus for tire building machines generally, and more particularly to an automatic compensating letoff brake for the stock strip feeding apparatus of a tire building machine.

Fabric used in the building tires is composed of generally bias cut pieces joined end to end to form an elongated piece of sheet material that is wound onto a supply roll. It is very important in the feeding of such fabric material such as ply stock, breaker strips or chaffer strips to avoid the application of tension during their delivery to the tire building drum that is adjacent to such supply rolls. This is critical since a pull on the fabric material tends to stretch the fabric material. Such stretching or uneven tensioning of the material can increase the space between the cords or cause uneven spacing between the cords. An important object of this invention is to provide fabric supplying means in which the fabric material is subjected to an even tension. Fabric material or stock unwound intermittently from a large supply roll located on a servicer must be fed evenly untensioned and in a manner to prevent overrunning. The present invention overcomes these problems by providing an automatic compensating letoff brake on the supply rolls of the servicers for the tire building drums. The compensator of the instant invention automatically decreases the braking power as the roll gets smaller and the roll coast (overrunning) also decreases as the roll decreases. In addition, with the designed compensator brake, the braking force will adjust automatically for roll width as well as diameter change.

SUMMARY OF THE INVENTION

The present invention is directed to a servicer for supplying sheet material at a predetermined constant tension to a tire building drum wherein a carriage is moveable along a line parallel to the axis of the drum. A plurality of supply rolls are rotatably journaled in bearings on the carriage. The shafts which support the supply rolls have one end journaled in a brake bearing which compensates for change in size and the quantity of sheet material remaining on the supply roll. The bearings have interacting surfaces with brake material on one rotating surface frictionally engaging a fixed surface with contact between such surfaces proportional to the quantity of material on the supply roll.

BRIEF DESCRIPTION OF THE DRAWINGS

The figures in the drawings represent structural details of a preferred embodiment of the invention in which:

FIG. 2 is a front elevational view of the supply roll servicing assembly.

FIG. 4 is a cross-sectional view of the bearing and automatic compensating letoff brake taken on line 4—4 of FIG. 3.

FIG. 5 is an enlarged side elevational view of the bearing.

FIG. 6 is an enlarged side elevational view in cross-sectional of a bearing member showing the collar mounting means.

FIG. 7 is an enlarged front elevational view partly in cross-section of a bearing member and its collar.

FIG. 8 is an enlarged side elevational view of the collar for a bearing member.

FIG. 9 is the front elevational view of the collar.

DETAILED DESCRIPTION

Figure 1:
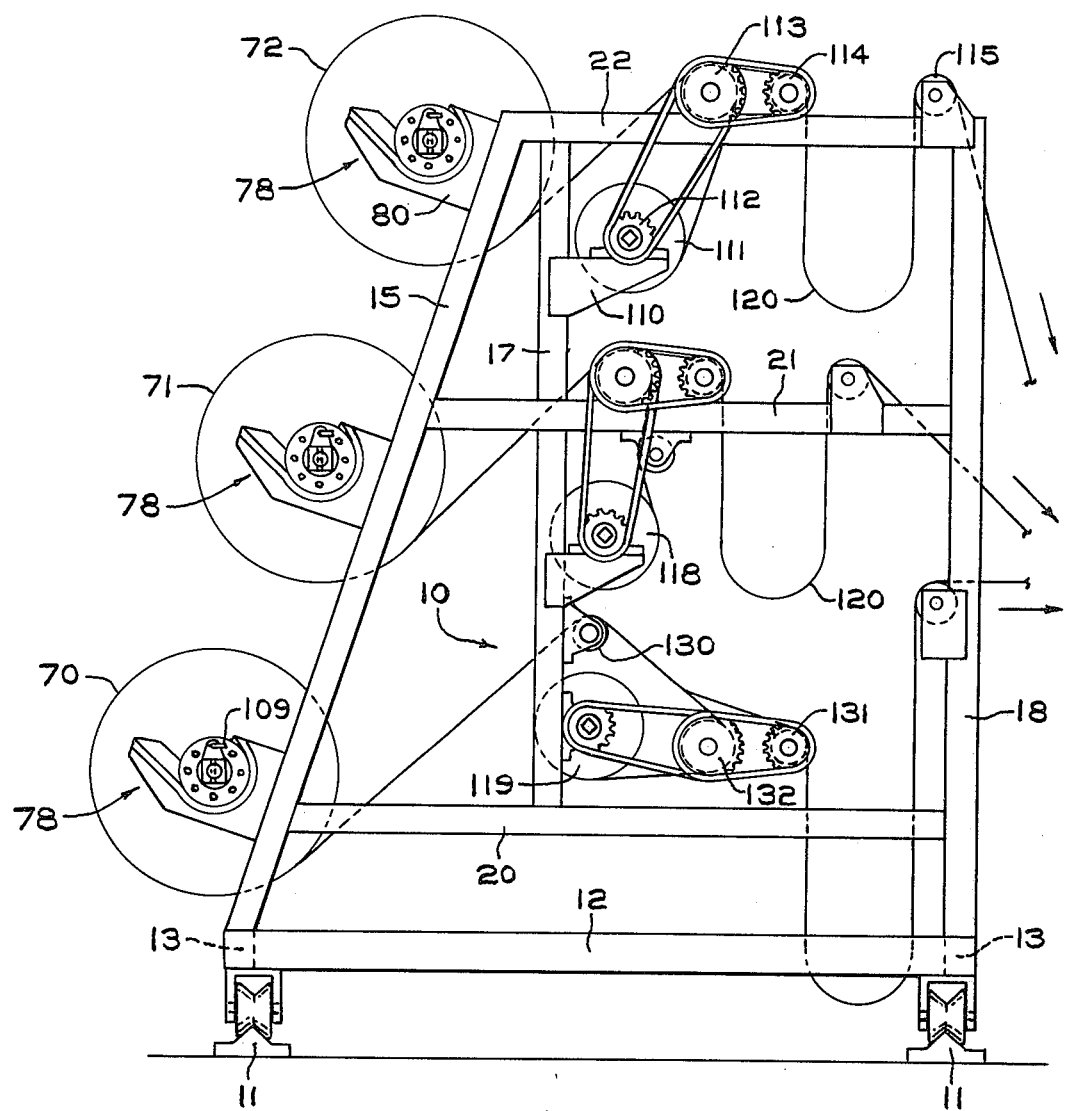
FIG. 1 is a side elevation of a portion of the supply roll servicing assembly which displays details of the take off from the supply roll.
Figure 3:
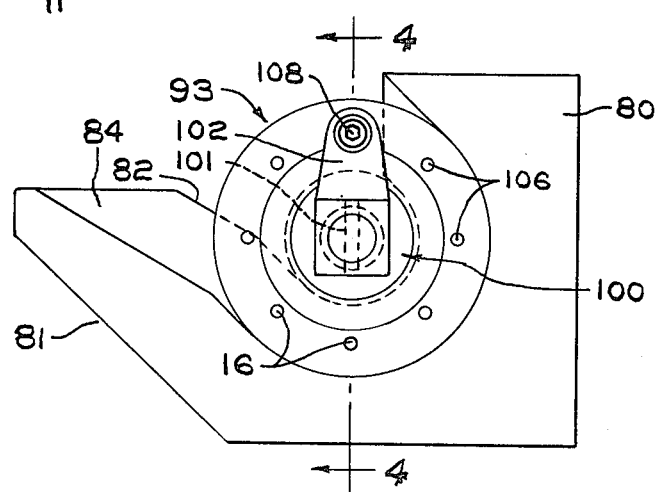
FIG. 3 is an enlarged fragmentary side elevational view of the bearing means for the automatic compensating letoff brake with the supply roll shaft in position.

Referring to the drawings, wherein like reference numerals designate like or corresponding parts throughout the several views, there is shown in FIG. 1 a carriage or central frame assembly 10 movably mounted on a pair of rails 11.

Carriage or central frame assembly 10 has a plurality of cross braces and interconnecting braces which are shown without many of the supporting structures to more clearly illustrate the invention. Carriage 10 has a pair of spaced side lower braces 12 interconnected by braces 13. Extending vertically upwardly from braces 12 and 13 are rear support members 15 and 16 along with support members 17 and 17. Interconnecting support member 15, 17 and 18 are cross members 20, 21 and 22.

As shown in FIG. 2, certain ones of the rear support member 15 are interconnected by cross members 25, 26, 27 and 28. Cross members 25, 26, 27 and 28 along with support member 15 supports respectively bearing members 30 and friction bearing member 31. Journaled for rotation in the respective pairs of bearing members 30 and 31 is a cantelevered shaft 35 supporting supply rolls 36, 37 and 38 respectively.

Shaft 35 is generally a square in cross section as at 40 for the entire length thereof except for end portion 41 to be described. The square cross section permits the rapid mounting of the supply rolls thereon. Each shaft 35 has a collar 42 (FIG. 6) slidably mounted on the square portion. Collar 42 is a hollow rectangular shaped member with four laterally extending side flanges 43. As viewed in FIGS. 6 and 7, the one side edge of hollow rectangular member 42 has a bore 44 for a purpose to be described.

Bearing member 31, which is suitably mounted on one of the support members 15 has an annular support member or housing 50 with a plurality of radially spaced lugs 51 and a pair of lugs 52. One of the lugs 52 has a theaded bore which receive a threaded bolt 53, which bolt 53 is adapted to reduce or increase the circumference of the annular support member or housing 50 to increase or decrease the size or the clearance space on a brake material 55 which is suitably secured to the outer periphery of an annular member 57 of an annular collar 56. A pair of split bushings 58 are located on the inner circumferential surface of annular member 57 and interconnected by a bolt 60. Bushings 58 encompass the round end of shaft 35. The spaced lugs 51 are suitably connected to the support members 15 to provide a stationary or fixed support for a braking action. The one end of annular member 57 has a threaded bore 61 for receiving a threaded bolt 62 with a reduced end portion 63 which is adapted to project into bore 44 of a ring 42 to interconnect ring 42 to shaft 35 and collar 56. Collar 56 has a plurality of slots 65 which receive flanges 43 of ring 42.

Upon placement of a supply roll of fabric 38 onto shaft 35, the load is supported on bearing member 30 and friction bearing member 31. With bolt 62 threaded into bore 61 and with the reduced end portion 63 projecting into bore 44 of ring 42, the shaft 35 is locked into rotation with collar 56 whose braking material 55 is in frictional engagement with stationary annular support 50. The degree of frictional contact between the material 55 and the annular support 50 is adjusted for clearance as it is the weight and quantity of material that determines braking action. As the supply roll 38 is reduced in its diameter due to the utilization of the material therefrom the weight of the bulk material in the supply roll 38 will decrease and its corresponding weight and friction on brake material 55 will decrease. In the event that the operator wishes to rewind the stock back onto roll 38, the threaded bolt 62 is removed from bore 44 which permits the lateral shifting of ring 42 (to the left as viewed in FIG. 6) permitting the free, unrestricted rotation of shaft 35 relative to collar 56 and braking material 55.

As shown in FIGS. 1 and 2, three supply rolls 70, 71 and 72 are supported by shafts 73, 74 and 75 respectively. Shaft 73, 74 and 75 are supported on the one end by bearing members 78 and on the other end by bearing member 79. Bearing member 79 secured to support member 15 is essentially a cradle which receives one end of the shaft. All three bearing members 78 are alike and only one will be described. Bearing member 78 includes a bracket 80 that is secured to the outside vertical support member 15 (FIG. 2). Bearing member or cradle 78 has a housing that is generally U-shaped that is triangular in cross section having an outer peripheral edge 81 that is thick in cross section which tapers inwardly to an apex 82 on the inner periphery. The upper portion of the cradle or bearing member 31 is triangular in cross-section with circumferentially extending side portions 83 and 84. Such side portions 83 and 84 define a surface that is a sector whose geometrical figure is bounded by two radii and the included arc of a circle. Such surface may be a flat surface arcuate surface. As used herein sector limits the surface to less than three hundred degrees. The shaft 75 (FIG. 4) which is generally square in cross-section (designated at 90) has a round portion 91 and a reduced round (in cross-section) portion 92. Round portion 91 receives a collar 93 which has a flange with a hub 94 and a pair of diverging annular portions 95-96 which form a V-shaped inner surface in cross-section for receiving spaced annular pads of brake material 97. The brake material 97—97 engages the side portions 83-84 of the cradle 78. The braking power of the brake material 97 on side portions 83 and 84 is increased substantially by having the side portions 83 and 84 angularly disposed in comparison to a smooth circumferential cylindrical surface.

A collar 100 is journaled on the reduced portion 92 of shaft 75 and is interconnected therewith by a pin 101. Collar 100 has a radially extending arm member 102 with a threaded bore 103 therein receiving a threaded lock pin 104. Lock pin 104 has a forwardly disposed end 105 that is adapted to engage one of a plurality of circumferentially spaced bores 106 to thereby interconnect the shaft 75 to the collar 93 and the brake material 97. Lock pin 104 has an octagonal shaped recess 108 on the end opposite the reduced end 105 to receive an Allen wrench 109 for backing off lock pin 104 out of bore 106 to thereby permit rotation of the shaft 75 when desired without being braked, since there is relative movement only between shaft 75 and collar 93 and none between braking material 97 and bracket 80.

A bracket 110 (FIG. 1) is suitable secured to support member 17 which in turn supports a liner take up roll 111 and a sprocket 112. Mounted above roll 111 on cross member 22 are a plurality of rolls 113, 114 and 115. Rolls 111, 113 and 114 are suitably interconnected by sprocket chains and driven by a motor drive unit not shown. A rubberized fabric stock material 120 which is a continuous sheet with cords embedded therein is usually wound onto a drum or roll with a liner material so that adjacent layers of wound fabric sheet material will not be in direct contact and thereby prevent adhesion between the tacky layers. As material 120 is unwound from roll 72 and fed over rolls 113 and 114 for movement over roller 115 and thence to a servicing tray for movement to a tire building drum in a manner well understood in the art (See U.S. Pat. No. 3,600,252), the liner material is fed over roller 113 for windup onto roller 111.

Each of the rolls 70 and 71 have similar liner windup rolls 118 and 119 with the stock materials 120 and 121 being fed to servicing trays not shown. The rubberized fabric and liner from supply roll 70 is directed over roller 130 and thence the rubberized fabric 120 is directed to roller 131 while the liner material is directed around roller 132 for windup onto roll 119.

A supply of fabric material rolled onto supply roll 72 is supported by shaft 75 on opposite ends by bearing members 79 and 78 respectively. Bearing member 79 is a rolling engagement while bearing member 78 provides the braking action to maintain uniform tension on the fabric as it is intermittently unwound from the servicer for use in the building of tires. As the rubberized fabric material 120 is unwound intermittently from supply roll 72, shaft 75 along with collar 93 rotate relative to braking material 97 such as to prevent overrunning of the material and maintaining an even tension on the material. When the supply roll is large, the inertia is also large and the braking requirements are at a maximum. As the supply roll decreases in diameter, the tension in the stock will be maintained constant since the inertia on the supply roll decrease and thus automatically adjusts the braking force. Such adjustment is also automatic for changes on supply rolls having different widths.

It will be apparent that, although a specific embodiment and certain modifications of the invention have been described in detail, the invention is not limited to the specifically illustrated and described constructions since variations may be made without departing from the principles of the invention.

What is claimed is:

1. In an assembly for supplying uncured tire components fabric to a tire building drum which comprises a frame with a plurality of supply rolls, each of said supply rolls being mounted on a shaft, each shaft being journaled in at least one bearing member that is secured to said frame, said bearing member having a housing that is generally U-shaped with an inner priphery, said housing is triangular in cross with the apex lying along the inner periphery and having a pair of side portions, each of said shafts having an annular collar on one end thereof, said collar having a flange with a pair of radially extending diverging annular portions, each of said annular portions having an inner peripheral surface, each of said inner peripheral surfaces having an annular braking material thereon that frictionally engages and rests on said side portions of said housing.

2. In an assembly for supplying uncured tire component fabric to a tire building drum as set forth in claim 1 wherein said collar includes lock means interconnected thereto for selective release therefrom to permit unrestricted rotation of said shaft relative to said collar.

3. In an assembly for supplying uncured tire component fabric to a tire building drum as set forth in claim 2 wherein said lock means includes a hub secured to said shaft, said hub having a radially extending member with a bore therein, said collar having a plurality of circumferentially spaced apertures that are the same radially distance from the axis of said shaft as said bore in said radially extending member of said hub, and a moveable pin mounted in said bore and operative to engage one of said apertures to lock said collar to said hub and said shaft.

4. In an assembly for supplying uncured tire fabric to a tire building drum which comprises a frame with a plurality of supply rolls thereon, one of said supply rolls being mounted on a shaft, one portion of said shaft having a portion square in cross-section, said shaft being cantilever mounted in bearing members said bearing member having a collar member axially slidably mounted on said square portion of said shaft, said bearing member having an annular support member secured to said frame, said shaft having an annular collar journaled on said shaft, said annular collar having a braking material secured to its outer periphery, said annular support member having an inner peripheral surface frictionally engaging said braking material, and lock means on said annular collar operative to engage said collar to rotate with said collar member and said shaft as a unit when said shaft is rotated.

5. In an assembly for supplying uncured tire fabric to a tire building drum as set forth in claim 4 wherein said annular collar has a plurality of slots therein, said collar member having a plurality of abutments which engage said slots on axial movement of said collar member into abutting contact with said annular collar.

6. In an assembly for supplying uncured tire fabric to a tire building drum as set forth in claim 5 wherein said lock means includes a bore in said collar member and a threaded pin journaled in said annular collar operative to engage said bore in said collar member to lock said collar member to said annular collar.

7. In an assembly for supplying uncured tire fabric to a tire building drum as set forth in claim 6 wherein said annular support member is a split ring interconnected by means for reducing the inner peripheral surface to adjust the clearance space with said braking material.

8. In an apparatus for supplying sheet material under a predetermined constant tension to a tire building machine which apparatus comprises a carriage laterally moveable on a pair of rails in an axial direction relative to a tire building drum mounted adjacent thereto, said carriage having a plurality of shafts jounaled thereon, each of said shafts having a supply roll mounted thereon for rotation therewith, said shafts journaled in bearing members mounted on said carriage for movement therewith, certain ones of said bearing members having a collar secured to one end of said shafts, each on said collars having an annular surface, braking material secured to said annular surfaces, and each of said certain bearing members having a circumferentially extending sector surface operative to frictionally support a portion of said braking material.

* * * * *